United States Patent
Filev et al.

(10) Patent No.: US 8,774,770 B2
(45) Date of Patent: Jul. 8, 2014

(54) METHODS AND DEVICES FOR PRIORITIZING MESSAGE THREADS

(71) Applicant: Google Inc., Mountain View, CA (US)

(72) Inventors: Momchil Filev, Mountain View, CA (US); Martin Freund, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/654,962

(22) Filed: Oct. 18, 2012

(65) Prior Publication Data

US 2014/0113596 A1    Apr. 24, 2014

(51) Int. Cl.
*H04M 1/725* (2006.01)
*H04W 24/00* (2009.01)

(52) U.S. Cl.
USPC .......... 455/412.1; 455/466; 455/456.1; 455/457; 455/566

(58) Field of Classification Search
USPC .......... 455/456.1–457, 566, 466, 412.1
See application file for complete search history.

(56) References Cited

U.S. PATENT DOCUMENTS

| | | | |
|---|---|---|---|
| 7,218,943 | B2 | 5/2007 | Klassen et al. |
| 7,752,279 | B2 | 7/2010 | Hardy et al. |
| 7,895,273 | B1 | 2/2011 | Haldar |
| 8,046,014 | B2 | 10/2011 | Donald et al. |
| 2003/0063128 | A1 | 4/2003 | Salmimaa et al. |
| 2003/0098892 | A1* | 5/2003 | Hiipakka ............ 345/846 |
| 2005/0204009 | A1 | 9/2005 | Hazarika et al. |
| 2007/0073686 | A1 | 3/2007 | Brooks et al. |
| 2007/0239834 | A1 | 10/2007 | Ji et al. |
| 2007/0282621 | A1 | 12/2007 | Altman et al. |
| 2011/0178962 | A1 | 7/2011 | Sood |
| 2012/0270563 | A1* | 10/2012 | Sayed ................ 455/456.3 |

FOREIGN PATENT DOCUMENTS

| | | |
|---|---|---|
| GB | 2473952 A | 3/2011 |
| WO | 2011055013 A1 | 5/2011 |

OTHER PUBLICATIONS

EP 13189428.9 Extended Search Report, Mailed Jan. 29, 2014.

* cited by examiner

*Primary Examiner* — Marisol Figueroa
(74) *Attorney, Agent, or Firm* — Troutman Sanders LLP; James E. Schutz; Scott D. Barnett

(57) ABSTRACT

Certain embodiments of this disclosure include methods and devices for prioritizing message threads. According to one embodiment, a method is provided for detecting a current location of an electronic device; determining contact location information describing one or more locations of one or more devices associated with one or more contacts; determining respective proximities between the electronic device and the one or more devices associated with the one or more contacts based at least in part on the current location of the electronic device and the contact location information to provide contact proximity information; identifying a plurality of message threads, wherein each message thread is associated with at least one of the one or more contacts; associating a respective priority value with each message thread based at least in part on the contact proximity information; and outputting, for display, formatting information based on the respective priority values.

19 Claims, 5 Drawing Sheets

METHODS AND DEVICES FOR PRIORITIZING MESSAGE THREADS

BACKGROUND

Electronic communication applications (e.g., text messaging applications, electronic mail applications, instant messaging applications, etc.) executing on mobile computing devices are increasingly relied upon as quick, convenient tools for facilitating communication. However, as these communication applications grow in popularity, their ease of use oftentimes suffers due to the increased message traffic to be handled.

For instance, in conventional electronic communication applications, message threads (i.e., groups of one or more messages between two or more entities bundled according to some characteristic) are often presented in chronological order based on the time of the newest message sent or received. Accordingly, a party attempting to access a given message thread frequently must scroll through a voluminous amount of message threads before identifying that message thread. Thus, ordering or prioritizing message threads purely based on chronology alone is not always optimal.

SUMMARY

The instant disclosure describes methods and devices for prioritizing message threads based on criteria above and beyond how recently a given message thread was activated. To this end, in one example, a method is provided. The method includes detecting a current location of an electronic device using the electronic device itself. Contact location information describing one or more locations of one or more devices associated with one or more contacts may be determined. Further, the proximities between the electronic device and the one or more devices associated with the one or more contacts may be determined in order to provide contact proximity information. In one example, these proximities are determined, at least in part, based on the current location of the electronic device and the contact location information. A plurality of message threads may also be identified. Each message thread of the plurality of message threads may be associated with at least one of the one or more contacts. Priority values may also be associated with each message thread based, at least in part, on the contact proximity information. As used herein, any given message thread may include one or more discrete messages. Finally, formatting information may be output for display based on the priority values associated with the message threads. Formatting information may include, for example, display information listing each message thread associated with each contact in a particular order based on the priority values associated with those message threads.

In one example, associating the priority values with the message threads includes associating a higher priority value with a first message thread associated with a first contact, wherein the first contact is associated with a first device of the one or more devices, and wherein the first device is in close proximity to the electronic device. This example may further include associating a lower priority value with a second message thread associated with a second contact, wherein the second contact is associated with a second device of the one or more devices, and wherein the second device is in further proximity to the electronic device than the first device.

In another example, the priority values may be associated with each message thread based on additional criteria. For example, priority values may also be associated with message threads based on at least two additional priority criteria. These additional priority criteria may include one or more of the following: identity information, frequency information, chronological information, and/or timing information. Identity information describes the identity of each of the one or more contacts. Frequency information describes the frequency at which the message threads associated with the contacts are activated. Chronological information describes how recently particular message threads were activated. Timing information describes a time at which message threads are regularly, or routinely, activated. For example, compiled historical use information (information describing the use patterns of an entity utilizing the communications application at issue) may indicate that a particular message thread is regularly activated on a particular day of the week at a particular time (e.g., a user regularly accesses the message thread associated with his mother at 5:00 p.m. every Sunday night). Timing information describes this compiled historical use information.

In one example, the foregoing method may include the additional steps of determining the formatting information for a first period of time based on a first priority criterion and determining the formatting information for a second period of time based on second priority criterion, wherein the first and second priority criteria may include any of the aforementioned priority criteria.

According to another embodiment, an electronic device is provided. The electronic device includes, at least, a location detecting component, a contact location determining component, a proximity determining component, a thread identification component, a priority values associating component, and a graphical user interface (GUI). The location detecting component is configured to detect a current location of the electronic device. The contact location determining component is configured to determine contact location information describing one or more locations of one or more devices associated with one or more contacts. The proximity determining component is configured to determine the proximities between the electronic device and the one or more devices associated with the one or more contacts based, at least in part, on the current location of the electronic device and the contact location information to provide contact proximity information. The thread identification component is configured to identify a plurality of message threads, wherein each message thread of the plurality of message threads is associated with at least one of the one or more contacts. The priority value associating component is configured to associate a priority value with each message thread based, at least in part, on the contact proximity information. The GUI is configured to display each message thread in a prioritized order based on the respective priority values assigned to the different message threads.

In another example embodiment, a computer program product embodied in a non-transitory computer-readable medium having an algorithm adapted to effectuate a method is provided. According to the method, respective priority values may be associated with each message thread of a first portion of a plurality of message threads based at least in part on a first criterion. Different respective priority values may be associated with each message thread of a second portion of the plurality of message threads based at least in part on a second criterion, wherein the first and second criteria are different. Formatting information comprising display information listing the plurality of message threads in a particular order based on the associated priority values may be generated for display on an electronic device.

These and other objects, features, and advantages of the foregoing method, electronic device, and computer program product will become more apparent upon reading the following specification in conjunction with the accompanying drawing figures.

BRIEF DESCRIPTION OF THE FIGURES

Reference will now be made to the accompanying figures and flow diagrams, which are not necessarily drawn to scale, and wherein.

DETAILED DESCRIPTION

Figure 1:
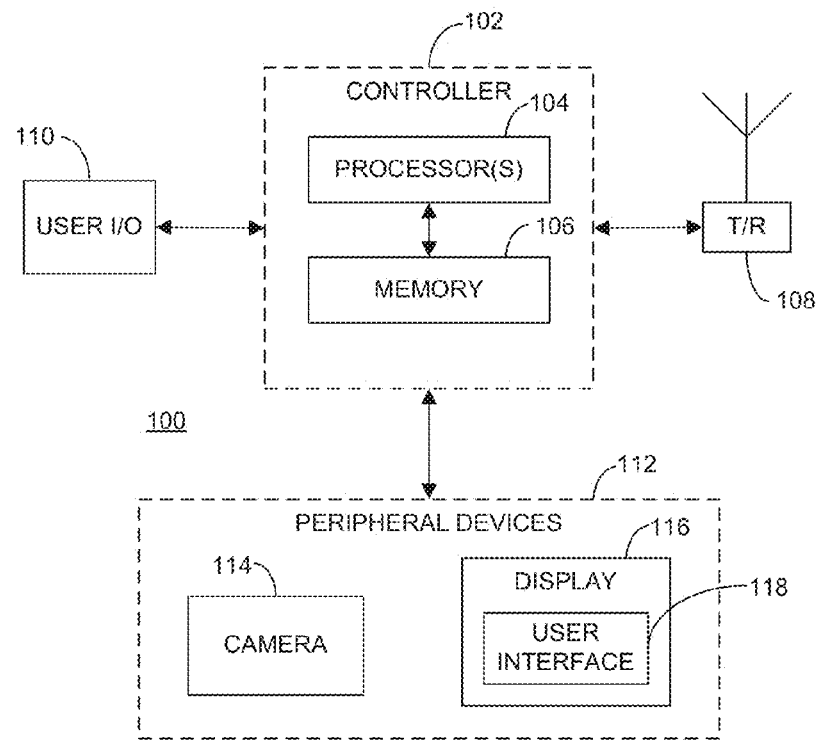
FIG. 1 is a block diagram illustrating one example of an electronic device suitable for use in prioritizing message threads in accordance with the disclosed technology.

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

Various embodiments of the disclosed technology provide methods, devices, and computer program products for prioritizing message threads. In one example embodiment, a method for prioritizing message threads is provided. The method may include detecting, by an electronic device, a current location of the electronic device. Contact location information describing one or more locations of one or more devices associated with one or more contacts may be determined. The respective proximities between the electronic device and each of the devices associated with each of the one or more contacts may also be determined in order to provide contact proximity information. In one example, these proximities are determined, at least in part, based on the current location of the electronic device and the contact location information. A plurality of message threads may also be identified. Each message thread of the plurality of message threads may be associated with at least one of the one or more contacts. Priority values may also be associated with each message thread based, at least in part, on the contact proximity information.

In another example embodiment, a computer program product embodied in a non-transitory computer-readable medium comprising an algorithm adapted to effectuate a method is provided. The method may include associating respective priority values with each message thread of a first portion of a plurality of message threads based, at least in part, on a first criterion. Different respective priority values may be associated with each message thread of a second portion of the plurality of message threads based, at least in part, on a second criterion. The first and second criterion may be different criteria. This method also includes generating, for display on an electronic device, formatting information based on the associated priority values.

In a further example of this embodiment, the method may also include detecting a current location of the electronic device. Contact location information may also be determined. Respective proximities between the electronic device and one or more devices associated with one or more contacts may also be determined. This determination may be made, at least in part, based on the current location of the electronic device and the contact location information to provide contact proximity information. In this example, the first criterion may be based, at least in part, on the contact proximity information. In yet another example of this embodiment, the second criterion may include chronological information describing how recently each message thread of the plurality of message threads was activated.

Referring now to the figures, in which like reference numerals represent like parts, various embodiments of the electronic devices and methods will be disclosed in detail. FIG. 1 is a block diagram illustrating one example of an electronic device 100 suitable for use in prioritizing message threads. The electronic device 100 may be, for example, a cellular phone, a "smart" phone, a personal digital assistant (PDA), a tablet, a laptop or desktop computer, or any other suitable communication device capable of performing the processing described herein.

In the illustrated example, the electronic device 100 includes a controller 102, a transceiver 108, a user input/output interface 110, and peripheral devices 112. The controller 102 includes one or more processors 104 and memory 106. In an embodiment, the one or more processors 102 may include one or more devices such as microprocessors, microcontrollers, digital signal processors, or combinations thereof, capable of executing stored instructions and operating upon stored data that is stored in, for example, the memory 106. The memory 106 may include one or more devices such as volatile or nonvolatile memory including, but not limited to, random access memory (RAM) or read only memory (ROM). Further still, the memory 106 may be embodied in a variety of forms, such as a solid state drive, hard drive, optical disk drive, floppy disk drive, etc. Processor and memory arrangements of the types illustrated in FIG. 1 are well known to those having ordinary skill in the art. In one embodiment, the processing techniques described herein are implemented as a combination of executable instructions and data within the memory 106 used to control operation of, and operated upon by, the one or more processors 104.

The user input/output 110 may include any suitable components for receiving input from, and/or communicating output to, a user. For example, the user input components could include a keypad, a touch screen, a mouse, a microphone and suitable voice recognition application, etc. The user output components may include, for example, speaker(s), light(s) (e.g., one or more LED lights), buzzer(s) (e.g., one or more components capable of vibrating to alert the user, for example, of an incoming text message), etc. Other suitable input/output components will be discussed below with regard to peripheral devices 112. The transceiver 108 may comprise one or more suitable transceivers capable of transmitting and receiving information as known in the art. For example, the transceiver 108 may transmit and receive information using wireless communication resources implementing any of a variety of communication protocols, such as TDM (time-division-multiplexed) slots, carrier frequencies, a pair of carrier frequencies, or any other radio frequency (RF) transmission media. Further still, although the transceiver 108 is illustrated in FIG. 1 as being wireless, those having ordinary skill in the art will appreciate that the transceiver 108 may be additionally/alternatively capable of supporting communication using wired communication resources.

The peripheral devices 112 are any devices that are typically external to the electronic device 100 that may nevertheless interact with the electronic device 100, non-limiting examples of which include a camera 114 and a display 116. While the peripheral devices 112 are typically external to the electronic device 100, they may instead be incorporated into the electronic device 100 as part of, for example, the user input/output 110. The camera 114 may be any suitable camera capable of capturing still image and/or video data using techniques known in the art. In one example, the camera 114 may include a digital camera configured to capture an image and/or video. The captured image/video may be stored locally, for example, in memory 106. The display 116 may include any conventional integrated or external display mechanism such as a touch screen, a LED display, a cathode ray tube (CRT) display, a plasma display, a LCD display, or any other display mechanism known to those having ordinary skill in the art. In an embodiment, the display 116, in conjunction with suitable stored instructions (e.g., suitable stored instructions stored in memory 106), may be used to implement a graphical user interface (GUI), such as graphical user interface 118. Implementation of a graphical user interface in this manner is well known to those having ordinary skill in the art.

Figure 2:
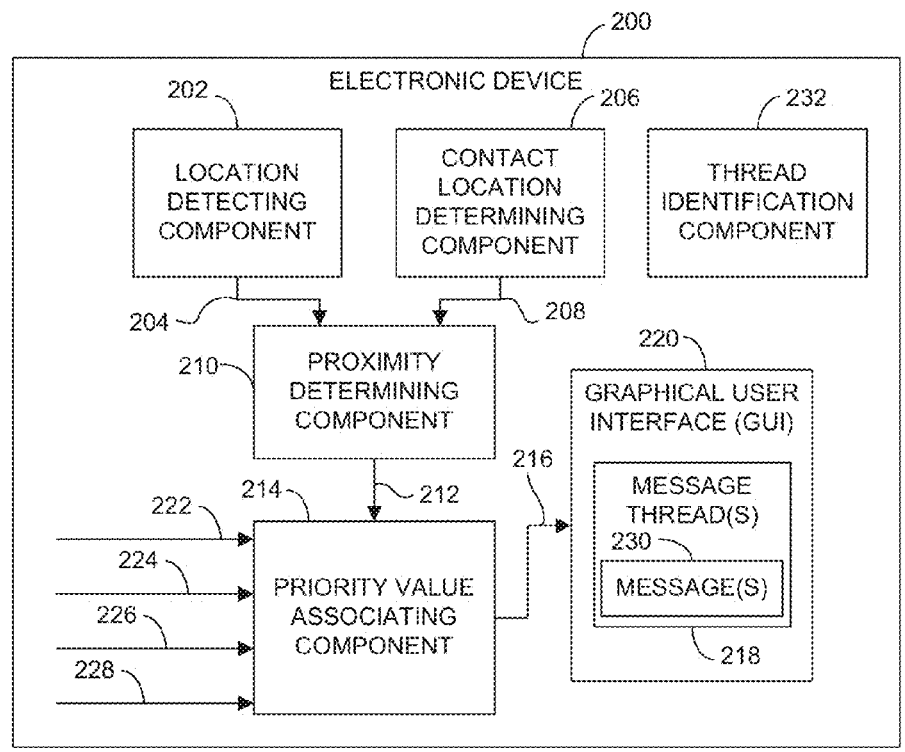
FIG. 2 is a block diagram illustrating another example of an electronic device suitable for use in prioritizing message threads in accordance with the disclosed technology.

FIG. 2 is a block diagram illustrating another example of an electronic device 200 for implementing the teachings of the disclosed technology. While the electronic device 200 is discussed generically as to its functionality, it is noted that the electronic device 200 may be implemented physically as the electronic device 100 previously discussed. The electronic device 200 includes a location detecting component 202, a contact location determining component 206, a proximity determining component 210, a thread identification component 232, a priority value associating component 214, and a graphical user interface 220. In one example, the components 202, 206, 210, 232, and 214 may be implemented as software modules that may be executed, for example, by one or more processors, such as the one or more processors 104 discussed above with regard to FIG. 1. However, those having ordinary skill in the art will recognize that the components 202, 206, 210, and 214 may equally be implemented using firmware and/or hardware devices such as application specific integrated circuits (ASICs), programmable logic arrays, state machines, etc. The GUI 220 may be implemented in line with the discussion concerning the GUI 118 discussed above with regard to FIG. 1.

In operation, the location detecting component 202 is configured to detect a current location of the electronic device 200. In one example, the location detecting component 202 may be implemented though global positioning system (GPS) technology (e.g., as a GPS receiver) capable of ascertaining the location of the electronic device 200. However, those having skill in the art will appreciate that the location detecting component 202 may be implemented using any suitable location detecting technology known in the art (e.g., cellular triangulation). The location detecting component 202 is further operative to output location information 204. The location information 204 is information describing the detected location of the electronic device 200. The location information 204 can take any suitable format such as GPS coordinates, a description of the city/county/state/country, etc.

The contact location determining component 206 is configured to determine contact location information 208 describing one or more locations of one or more devices associated with one or more contacts. As used herein, a "device" that is associated with a given contact may include any of the types of electronic devices discussed above with respect to the electronic device 100 of FIG. 1 (e.g., a cellular phone, a "smart" phone, a personal digital assistant (PDA), a tablet, a laptop or desktop computer) or any other suitable communication device known in the art. Furthermore, in one example, a device may be "associated" with a given contact because that contact owns/rents/controls/etc. the device. For example, a hypothetical contact named "John Doe" may be associated with a particular device (e.g., his cellular phone) because he owns that device.

As used herein, a "contact" is any entity that has, or will, communicate with the electronic device 200. For example, in an embodiment where the electronic device 200 is a cellular phone, the contacts may include the entities (e.g., people, companies, etc.) that have telephone numbers associated with them. Most current examples of the electronic device 200 (e.g., cellular phones, smart phones, PDAs, etc.) allow users to store a "contacts list" that typically includes the names of the contacts (e.g., "Mom," "Dad," "John Doe," etc.) and the telephone numbers/email addresses associated with those contacts.

Accordingly, in one embodiment, the contact location determining component 206 is configured to ascertain the location of the device associated with each contact in order to determine the contact location information 208. Those having ordinary skill in the art will recognize that there are a variety of well known techniques that may be used to ascertain the location of a device associated with a contact. For example, in one embodiment, the contacts' respective devices may "push" location information to the contact location determining component 206 of the electronic device 200. In this embodiment, the contact location determining component 206 may "subscribe" to a list of contacts from which it wants to receive device location information. In another embodiment, the contact location determining component 206 may query contacts' respective devices in order to ascertain where those devices (and presumably, those contacts themselves) are located.

The proximity determining component 210 receives the location information 204 (describing the location of the electronic device 200) and the contact location information 208 (describing the location of the devices associated with the one or more contacts) and performs further processing. Specifically, proximity determining component 210 is configured to determine the proximities between the electronic device 200 and each of the contact's respective devices (e.g., the distance between each of the contact's respective devices and the electronic device 200). Proximity determining component 210 may make this determination by comparing the location information 204 with the contact location information 208.

For example, the contact location information 208 may indicate that one particular contact's device is located at the Willis Tower in Chicago, Ill. (e.g., via precise GPS coordinates). The location information 204 may indicate that the electronic device 200 is located at the Hancock Tower, also in Chicago, Ill. The proximity determining component 210 is operative to use this respective information 204, 208 to calculate the proximity (i.e., the distance) between the electronic device 200 (located at Hancock Tower) and the contact's device (located at Willis Tower). While the previous example focused on calculating the proximity between a single contact's device and the electronic device 200, the proximity determining component 210 may make this same calculation with regard to any, or all, of the contacts' devices in order to generate the contact proximity information 212.

The thread identification component 232 is configured to identify a plurality of message threads (e.g., message threads 218). Each message thread of the plurality of message threads may be associated with at least one contact. For example, in one embodiment, the thread identification component 232 is configured to identify (e.g., locate) data representing the different message threads associated with the different contacts. This data may be stored locally on the electronic device 200 or remotely (e.g., on a server computer) as known in the art. Furthermore, while it is typical that a given message thread is associated with only a single contact, those having skill in the art will recognize that message threads may, in some instances, be associated with more than one contact. For example, in one embodiment of this technology, a message thread may be associated with a group of contacts (e.g., a group of contacts sharing one or more characteristics).

The priority value associating component 214 is configured to associate a respective priority value with each message thread (e.g., message thread(s) 218) based, at least in part, on the contact proximity information 212. In line with the teachings of this disclosure, the priority values can take any suitable format. For example, in one embodiment, the priority values may be expressed using a ten-point scale, where a priority value of "1" represents a low priority and a priority value of "10" represents a high priority. In this manner, the message threads associated with the contacts can be prioritized based on, at least, the proximity between the devices associated with those contacts and the electronic device 200. In one example, the priority value associating component 214 is configured to associate a higher priority value to the message threads associated with contacts' devices that are in close proximity to the electronic device 200 and a lower priority value to the message threads associated with contacts' devices that are in further proximity to the electronic device 200. What constitutes "close proximity" and "further proximity" is a matter of design choice and any suitable proximity rating scheme may be used by the priority value associating component 214 in this regard.

In some instances, criteria other than contact proximity may be used by the priority value associating component 214 to affect the priority values that are associated with the message threads. For example, in one embodiment, any or all of identity information 222, frequency information 224, chronological information 226, and/or timing information 228 may also be used to influence the priority values associated with message threads. For example, in one embodiment, the priority values may be associated with message threads based on (a) the respective proximities of the contacts' devices to the electronic device 200 and (b) two different criterion (e.g., the identify information 222 and the frequency information 224).

The identity information 222 describes the identity of each of the contacts (e.g., the names of the contacts). For example, certain contacts may warrant having the text message thread associated with them given a higher priority because, for instance, they are friends or family of the owner of the electronic device 200 (e.g., a spouse/significant other/parent/child/etc.). The frequency information 224 describes the frequency at which the message threads associated with the contacts are activated. Again, as used herein, a message thread may be "activated" by, for example, the thread being updated with a new message (e.g., a new message is sent or received thereby updating the message thread to which the new message belongs) or by a user simply accessing a message thread (e.g., opening/expanding a message thread such that the individual messages making up the thread are available for inspection). The chronological information 226 describes how recently any given message threads were activated. The timing information 228 describes a time at which message threads are regularly, or routinely, activated. For example, compiled historical use information (information describing the use patterns of an entity utilizing the electronic device 200) may indicate that a particular message thread is regularly activated on a particular day of the week at a particular time (e.g., a user regularly accesses the message thread associated with his mother at 5:00 p.m. every Sunday night). The timing information 228 describes this compiled historical use information.

Regardless of the criteria used to determine the priority values to be assigned to the message threads, the priority value associating component 214 is operative to generate formatting information 216 for display on the GUI 220 of the electronic device 200. The formatting information 216 is based on the priority values that were associated with the message threads and details, for example, the order in which each of the message threads 218 should be displayed on the GUI 220. Each of the message threads 218 may include one or more discrete messages 230 (e.g., one or more discrete text messages within a text message thread) that are visible when a user activates one of the message threads 218 (e.g., opens a message thread to view all of the messages included within that thread). In this manner, a user of the electronic device 200 can view message threads in a prioritized order that takes into account how recently a given message thread was activated.

In another example embodiment, the formatting information 216 may be determined (and output for display) for a first period of time based on a first priority criterion (e.g., the contact proximity information 212). In this example embodiment, the formatting information 216 may also be determined for a second period of time based on a second priority criterion (e.g., the chronological information 226). In this manner, the message thread(s) 218 may be prioritized during one time frame based on a criterion such as the contact proximity information 212, and then prioritized during a different (e.g., later) time frame based on a different criterion such as the chronological information 226 to provide improved flexibility in terms of the prioritization scheme.

Figure 3:
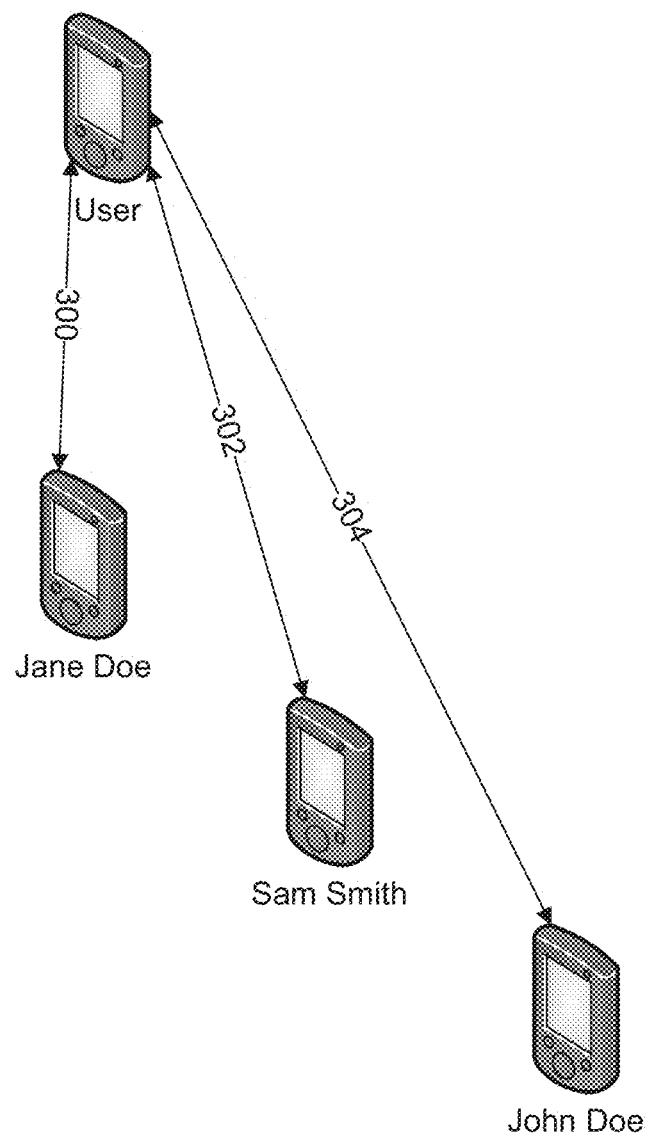
FIG. 3 is a diagram illustrating proximities between an electronic device, such as the electronic devices shown in FIGS. 1 and 2, and various contacts.

FIG. 3 is a diagram illustrating proximities between a user's electronic device (e.g., electronic device 200) and three of that user's contacts' devices. Specifically, distance 300 represents the proximity between the user's electronic device and the device of a contact named Jane Doe. Distance 302 represents the proximity between the user's electronic device and the device of a contact named Sam Smith. Finally, distance 304 represents the proximity between the user's electronic device and the device of a contact named John Doe. As shown, distance 304 is greater than distance 302, which is in turn greater than distance 300. That is, Jane Doe's device is closest to the user's device, John Doe's device is the furthest away, and Sam Smith's device is at a distance somewhere in between Jane Doe's device and John Doe's device. The effect of the spatial proximities illustrated in this figure is discussed in additional detail with regard to FIG. 4 below.

Figure 4:
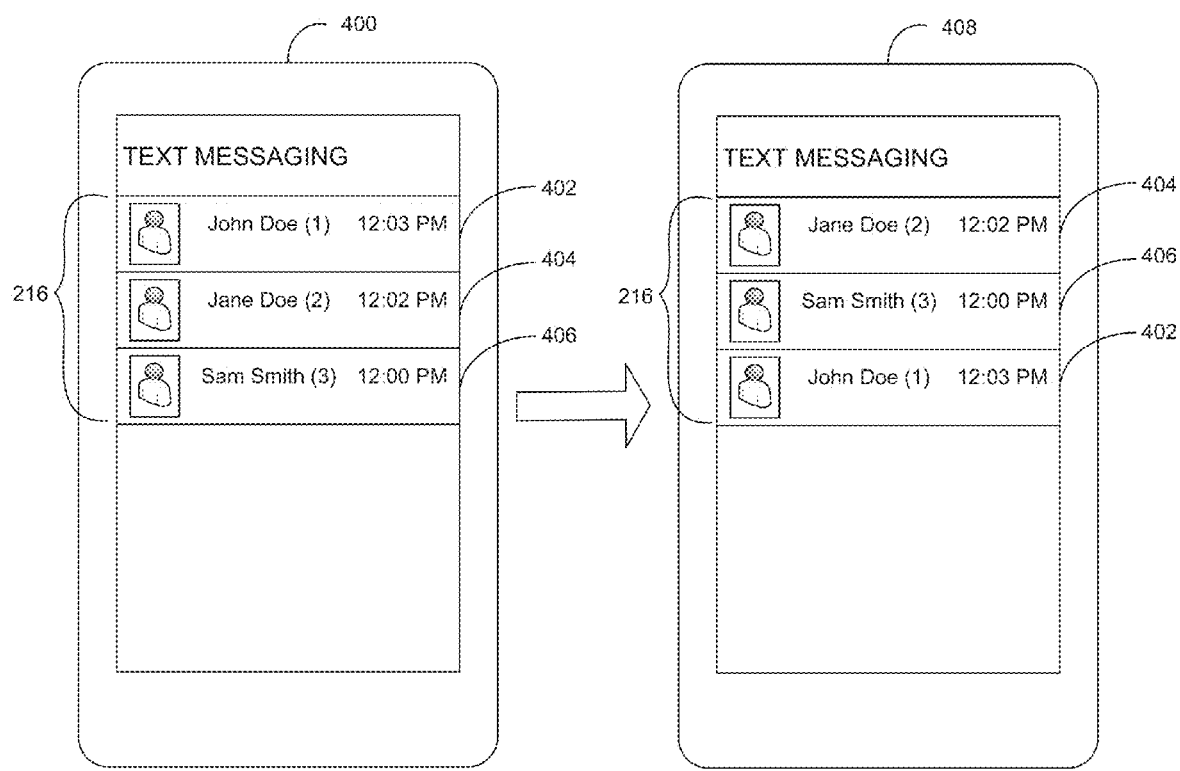
FIG. 4 is a diagram illustrating how formatting information can dynamically change when the method described herein is applied by an electronic device, such as the electronic devices shown in FIGS. 1 and 2.

FIG. 4 is a diagram illustrating how formatting information 216 can change when one example of the prioritization technique disclosed herein is applied. Moreover, FIG. 4 illustrates one example of determining formatting information 216 for a first period of time based on a first priority criterion (e.g., chronological information 226) and determining formatting information for a second period of time based on a second priority criterion (e.g., contact proximity information 212). With regard to FIG. 4, the electronic device 400 on the left side of this figure is shown in a state where the message threads 402, 404, 406 (collectively, representing the formatting information 216) are ordered according to how recently the respective message threads were activated (e.g., how recently a message was sent or received). For example, message thread 402 associated with contact John Doe was last activated at 12:03 PM as indicated by the timestamp on this message thread. Similarly, message thread 404 associated with contact Jane Doe was last activated at 12:02 PM, and thus, is ordered below John Doe's message thread 402 (because it was activated less recently than John Doe's message thread 402). Finally, message thread 406 associated with contact Sam Smith was last activated at 12:00 PM, and thus, is ordered below message threads 402 and 404.

The electronic device 408 on the right side of FIG. 4 is shown in a state where the message threads have been dynamically reordered to take into account the proximities of the contacts associated with those message threads to the electronic device 408. In particular, electronic device 408 shows how the message threads would be reordered based on the spatial proximities shown in FIG. 3 and discussed above. That is, because Jane Doe was closest to the User (who is treated as the owner of electronic device 408 for purposes of this example), the message thread 404 associated with her is given the highest priority (i.e., ordered at the top of the stack of message threads). Because John Doe was furthest from the User (based on the location of the device associated with John Doe), the message thread 402 associated with him is given the lowest priority (i.e., ordered at the bottom of the stack of message threads). In this manner, and in line with the teachings of the present disclosure, the formatting information 216 can dynamically be adjusted to reorder/newly order message threads associated with contacts as the proximities between the electronic device 408 and the devices associated with the contacts change.

Figure 5:
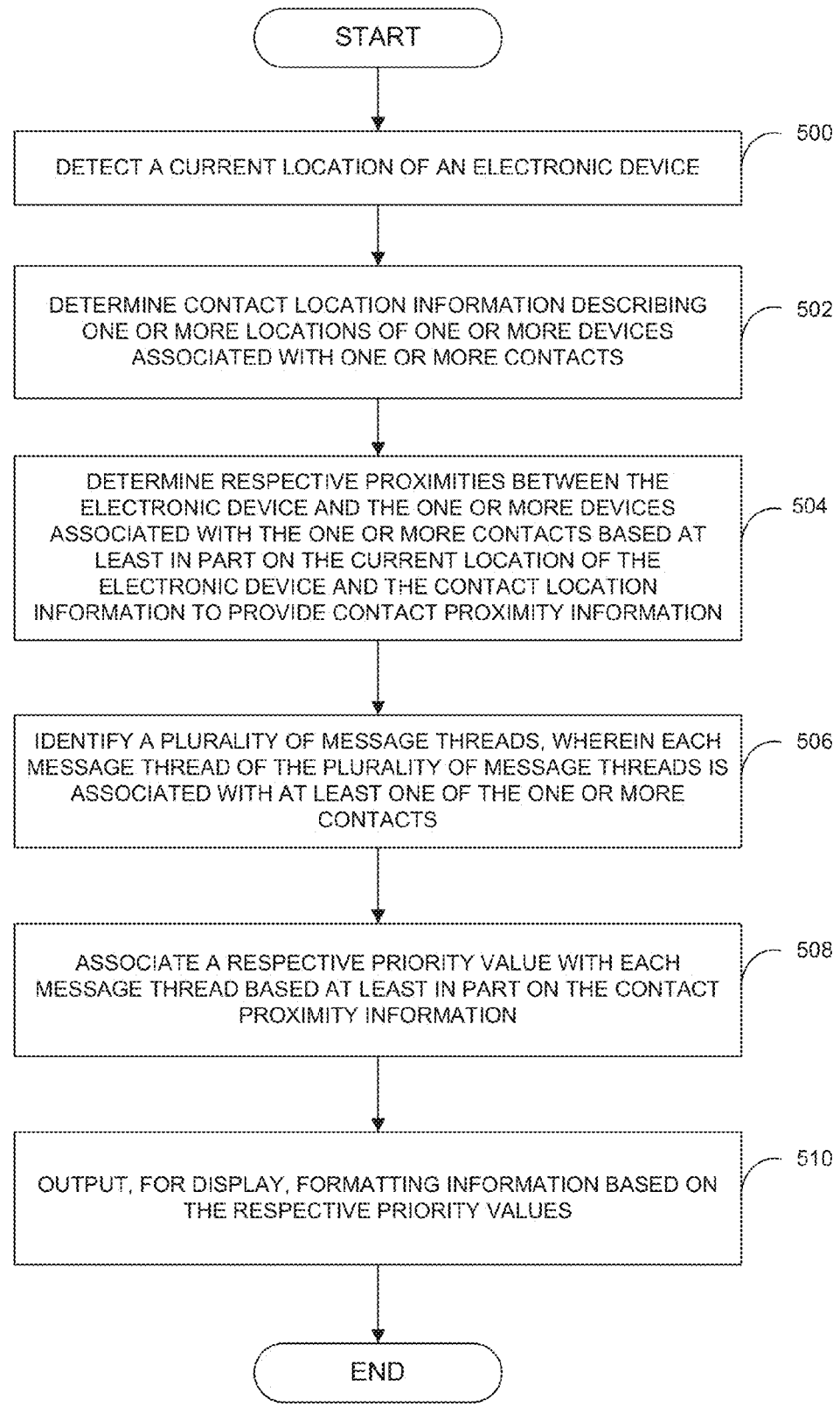
FIG. 5 is a flow diagram illustrating a method according to one embodiment of the disclosed technology.

Referring now to FIG. 5, a flow diagram illustrating a method for prioritizing message threads in accordance with one embodiment of the instant disclosure is provided. While the electronic devices 100, 200 are two forms for implementing the processing described herein (including that illustrated in FIG. 5), those having ordinary skill in the art will appreciate that other, functionally equivalent techniques may be employed. Furthermore, as known in the art, some or all of the functionalities implemented via executable instructions may also be implemented using firmware and/or hardware devices such as supplication specific circuits (ASICs), programmable logic arrays, state machines, etc. Once again, those of ordinary skill in the art will appreciate the wide number of variations that may be used in this manner.

Beginning at step 500, a current location of an electronic device is detected. At step 502, contact location information describing one or more locations of one or more devices associated with one or more contacts is determined. At step 504, respective proximities between the electronic device and the one or more devices associated with the one or more contacts are determined to provide contact proximity information. These determinations may be based, at least in part, on the current location of the electronic device and the contact location information. At step 506, a plurality of message threads are identified. Each message thread of the plurality of message threads may be associated with one or more contacts. At step 508, a respective priority value is associated with each message thread based, at least in part, on the contact proximity information. Finally, at step 510, formatting information is output for display. The formatting information may be based on the respective priority values.

Figure 6:
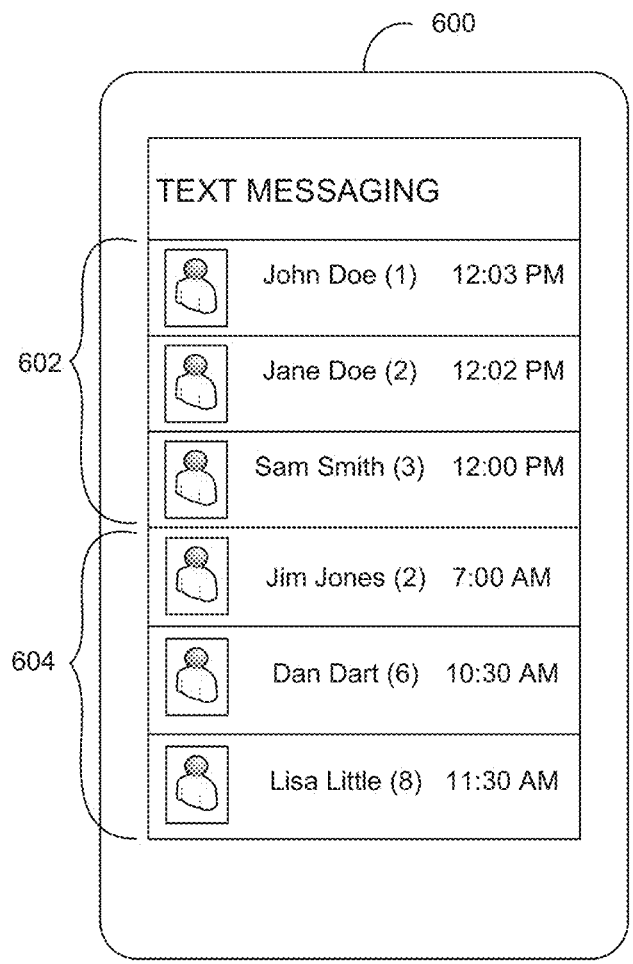
FIG. 6 is a diagram illustrating how a first portion of message threads may be prioritized based, at least in part, on a first criterion while a second portion of message threads may be prioritized based, at least in part, on a second criterion.

Referring now to FIG. 6, a diagram is provided illustrating one example of prioritizing a first portion of message threads based, at least in part, on a first criterion and prioritizing a second portion of the message threads based, at least in part, on a second criterion. Specifically, electronic device 600 is shown displaying formatting information representing a first portion of message threads 602 and a second portion of message threads 604. In accordance with this example embodiment, the first portion of message threads 602 are shown being prioritized (e.g., ordered) based on a first priority criterion. In this example, the first priority criterion is chronological information 226, although those having skill in the art will appreciate that any other, or additional, suitable criterion may be equally employed. Accordingly, the first portion of message threads 602 are shown being ordered according to how recently each of the respective message threads were activated (e.g., how recently a message associated with any given contact was sent or received). Conversely, the second portion of message threads 604 is prioritized based on, at least, a second criterion that is different than the first criterion. For example, the second criterion could include contact proximity information 212. In this manner, a first portion of message threads 602 may be prioritized based upon, at least, a first criterion while a second portion of message threads 604 may be prioritized based upon, at least, a second criterion.

Certain embodiments of this technology are described above with reference to block and flow diagrams of electronic devices and methods and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

In line with the above-discussion concerning computer program products, in one example embodiment, a computer program product is provided that allows different sets (i.e., portions) of message threads to be prioritized based on different criterion. In this example embodiment, a computer program product embodied in a non-transitory computer-readable medium including an algorithm adapted to effectuate a method is provided. This method may include associating respective priority values with each message thread of a first portion of a plurality of message threads based, at least in part, on a first criterion (e.g., the contact proximity information 212 described above). Different respective priority values may be associated with each message thread of a second portion of the same plurality of message threads based, at least in part, on a second, different criterion (e.g., the chronological information 226 described above). Formatting information comprising display information listing the plurality of message threads in a particular order based on the associated priority values may be generated. In this manner, the instant disclosure provides a technique for prioritizing one portion of the message threads based on one criterion and a second portion of the message threads based on a different criterion.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology, including the best mode, and also to enable any person skilled in the art to practice certain embodiments of this technology, including making and using any devices or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Furthermore, in situations in which the methods and devices discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how much information is collected about the user and used by a content server.

What is claimed is:

1. A method comprising:
   detecting, by an electronic device, a current location of the electronic device;
   determining contact location information, wherein the contact location information describes one or more locations of one or more devices associated with one or more contacts;
   determining respective proximities between the electronic device and the one or more devices associated with the one or more contacts based at least in part on the current location of the electronic device and the contact location information to provide contact proximity information;
   identifying a plurality of message threads, wherein each message thread of the plurality of message threads is associated with at least one of the one or more contacts;
   associating a respective priority value with each message thread based at least in part on the contact proximity information; and
   outputting, for display, formatting information based on the respective priority values.

2. The method of claim 1, wherein associating the respective priority value with each message thread comprises:
   associating a higher priority value with a first message thread associated with a first contact, the first contact being associated with a first device of the one or more devices, wherein the first device is in close proximity to the electronic device; and
   associating a lower priority value with a second message thread associated with a second contact, the second contact being associated with a second device of the one or more devices, wherein the second device is in further proximity to the electronic device than the first device.

3. The method of claim 1, wherein associating the respective priority value with each message thread is also based on at least two priority criteria.

4. The method of claim 3, wherein each priority criterion may comprise any one of:
   identity information describing an identity of each of the one or more contacts;
   frequency information describing a frequency at which each message is activated;
   chronological information describing how recently each message was activated; and
   timing information describing a time at which each message thread is regularly activated.

5. The method of claim 4, wherein each message thread may be activated by at least one of the following conditions:
   the message thread is accessed, such that at least one message of the message thread is available for inspection; and
   the message thread is updated to include an additional message.

6. The method of claim 1, wherein the formatting information comprises display information listing each message thread in a particular order based on the respective priority values of each message thread of the plurality of message threads.

7. The method of claim 1, further comprising:
determining the formatting information for a first period of time based on a first priority criterion; and
determining the formatting information for a second period of time based on second priority criterion.

8. The method of claim 7, wherein the first priority criterion is based at least in part on the contact proximity information and wherein the second priority criterion is based at least in part on chronological information.

9. The method of claim 1, wherein each message thread comprises one or more messages.

10. An electronic device comprising:
a location detecting component configured to detect a current location of the electronic device;
a contact location determining component configured to determine contact location information, wherein the contact location information describes one or more locations of one or more devices associated with one or more contacts;
a proximity determining component configured to determine respective proximities between the electronic device and the one or more devices associated with the one or more contacts based at least in part on the current location of the electronic device and the contact location information to provide contact proximity information;
a thread identification component configured to identify a plurality of message threads, wherein each message thread of the plurality of message threads is associated with at least one of the one or more contacts;
a priority value associating component configured to associate a respective priority value with each message thread based at least in part on the contact proximity information; and
a graphical user interface (GUI) configured to display each message thread in a prioritized order based on the respective priority values.

11. The electronic device of claim 10, wherein the priority value associating component is further configured to:
associate a higher priority value with a first message thread associated with a first contact, the first contact being associated with a first device of the one or more devices, wherein the first device is in close proximity to the electronic device; and
associate a lower priority value with a second message thread associated with a second contact, the second contact being associated with a second device of the one or more devices, wherein the second device is in further proximity to the electronic device than the first device.

12. The electronic device of claim 10, wherein the priority value associating component is further configured to associate a respective priority value with each message thread based on at least two priority criteria.

13. The electronic device of claim 12, wherein each priority criterion may comprise any one of:
identity information describing an identity of each of the one or more contacts;
frequency information describing a frequency at which each message thread is activated;
chronological information describing how recently each message thread was activated; and
timing information describing a time at which each message thread is regularly activated.

14. The electronic device of claim 13, wherein each message thread may be activated by at least one of the following conditions:
the message thread is accessed, such that at least one message of the message thread is available for inspection; and
the message thread is updated to include an additional message.

15. The electronic device of claim 10, wherein each message thread comprises one or more messages.

16. A computer program product embodied in a non-transitory computer-readable medium, the computer program product comprising an algorithm adapted to effectuate a method comprising:
detecting a current location of the electronic device;
determining contact location information, wherein the contact location information describes one or more locations of one or more devices associated with one or more contacts;
determining respective proximities between the electronic device and the one or more devices associated with the one or more contacts based at least in part on the current location of the electronic device and the contact location information to provide contact proximity information;
associating respective priority values with each message thread of a first portion of a plurality of message threads based at least in part on a first criterion, wherein the first criterion is based at least in part on the contact proximity information;
associating different respective priority values with each message thread of a second portion of the plurality of message threads based at least in part on a second criterion, wherein the first and second criteria are different criteria; and
generating, for display on an electronic device, formatting information comprising display information listing the plurality of message threads in a particular order based on the associated priority values.

17. The computer program product of claim 16, wherein the second criterion comprises chronological information describing how recently each message thread of the plurality of message threads was activated.

18. The computer program product of claim 17, wherein each message thread may be activated by at least one of the following conditions:
the message thread is accessed, such that at least one message of the message thread is available for inspection; and
the message thread is updated to include an additional message.

19. The computer program product of claim 16, wherein each message thread comprises one or more messages.

* * * * *